(12) United States Patent
Wamprecht et al.

(10) Patent No.: US 9,096,717 B2
(45) Date of Patent: Aug. 4, 2015

(54) PROCESS FOR THE PREPARATION OF POLYOL MIXTURES

(75) Inventors: Christian Wamprecht, Neuss (DE); Christoph Gürtler, Köln (DE)

(73) Assignee: Bayer Intellectual Property GmbH, Monheim (DE)

( * ) Notice: Subject to any disclaimer, the term of this patent is extended or adjusted under 35 U.S.C. 154(b) by 55 days.

(21) Appl. No.: 13/808,470

(22) PCT Filed: Jul. 4, 2011

(86) PCT No.: PCT/EP2011/061174
§ 371 (c)(1),
(2), (4) Date: Feb. 8, 2013

(87) PCT Pub. No.: WO2012/004209
PCT Pub. Date: Jan. 12, 2012

(65) Prior Publication Data
US 2013/0150526 A1 Jun. 13, 2013

(30) Foreign Application Priority Data

Jul. 5, 2010 (DE) .......................... 10 2010 030 950

(51) Int. Cl.
| | |
|---|---|
| *C08G 64/42* | (2006.01) |
| *C08G 18/44* | (2006.01) |
| *C08G 18/48* | (2006.01) |
| *C08G 18/50* | (2006.01) |
| *C08G 18/79* | (2006.01) |
| *C08G 64/34* | (2006.01) |
| *C08G 65/26* | (2006.01) |
| *C08G 65/333* | (2006.01) |
| *C08G 71/04* | (2006.01) |
| *C09D 175/04* | (2006.01) |
| *C08G 18/46* | (2006.01) |
| *C08L 69/00* | (2006.01) |
| *C08L 75/12* | (2006.01) |

(52) U.S. Cl.
CPC ............... *C08G 64/42* (2013.01); *C08G 18/44* (2013.01); *C08G 18/4615* (2013.01); *C08G 18/4866* (2013.01); *C08G 18/5045* (2013.01); *C08G 18/792* (2013.01); *C08G 64/34* (2013.01); *C08G 65/2603* (2013.01); *C08G 65/2663* (2013.01); *C08G 65/33303* (2013.01); *C08G 71/04* (2013.01); *C08L 69/00* (2013.01); *C08L 75/12* (2013.01); *C09D 175/04* (2013.01)

(58) Field of Classification Search
CPC .................. C08G 64/42; C08L 75/12

USPC .............. 528/61, 409; 524/590, 591
See application file for complete search history.

(56) References Cited

U.S. PATENT DOCUMENTS

| | | |
|---|---|---|
| 3,404,109 A | 10/1968 | Milgrom |
| 3,829,505 A | 8/1974 | Herold |
| 3,941,849 A | 3/1976 | Herold |
| 4,263,408 A | 4/1981 | Meyborg et al. |
| 4,758,615 A * | 7/1988 | Engel et al. .............. 524/198 |
| 4,826,953 A | 5/1989 | Kuyper et al. |
| 5,158,922 A | 10/1992 | Hinney et al. |
| 5,470,913 A | 11/1995 | van der Meer et al. |
| 6,713,599 B1 | 3/2004 | Hinz et al. |
| 7,008,900 B1 | 3/2006 | Hofmann et al. |
| 8,247,467 B2 * | 8/2012 | Mijolovic et al. .......... 521/172 |
| 8,729,210 B2 * | 5/2014 | Blum et al. ................. 528/59 |
| 2003/0204042 A1 | 10/2003 | Moethrath et al. |
| 2009/0018224 A1* | 1/2009 | Niesten et al. .............. 521/63 |
| 2010/0048935 A1 | 2/2010 | Mijolovic et al. |
| 2011/0124799 A1* | 5/2011 | Li et al. ..................... 524/542 |

FOREIGN PATENT DOCUMENTS

| | | |
|---|---|---|
| DE | 2832253 A1 | 1/1980 |
| EP | 0700949 A2 | 3/1996 |
| EP | 0743093 A1 | 11/1996 |
| EP | 0761708 A2 | 3/1997 |
| EP | 1359177 A1 | 11/2003 |
| WO | WO-97/40086 A1 | 10/1997 |
| WO | WO-98/16310 A1 | 4/1998 |
| WO | WO-00/47649 A1 | 8/2000 |
| WO | WO-03/028644 A2 | 4/2003 |
| WO | WO-2004087788 A1 | 10/2004 |
| WO | WO-2006103212 A1 | 10/2006 |
| WO | WO-2008/013731 A1 | 1/2008 |
| WO | WO-2008092767 A1 | 8/2008 |

OTHER PUBLICATIONS

International Search Report for PCT/EP2011/061174 mailed Oct. 31, 2011.

* cited by examiner

*Primary Examiner* — Tae H Yoon
(74) *Attorney, Agent, or Firm* — Drinker Biddle & Reath LLP

(57) ABSTRACT

The invention relates to a process for the preparation of polyol mixtures comprising polyether carbonate polyol and polyol containing urethane groups, characterized in that
  (i) in a first step one or more alkylene oxides and carbon dioxide are added on to one or more H-functional starter substances in the presence of at least one DMC catalyst ("copolymerization"), and
  (ii) in a second step at least one amino-functional substance is added to the crude mixture formed in step (i),
and a process for the preparation of polyurethane from these mixtures.

9 Claims, No Drawings

PROCESS FOR THE PREPARATION OF POLYOL MIXTURES

RELATED APPLICATIONS

This application is a national stage application (under 35 U.S.C. §371) of PCT/EP2011/061174, filed Jul. 4, 2011, which claims benefit of German application 10 2010 030 950.8, filed Jul. 5, 2010.

The invention relates to a process for the preparation of polyol mixtures comprising polyether carbonate polyol and polyol containing urethane groups and to a process for the preparation of polyurethane from these mixtures.

The preparation of polyether carbonate polyols by catalytic addition of alkylene oxides (epoxides) and carbon dioxide on to H-functional starter substances (starters) has been investigated intensively for more than 40 years (Inoue et al., Copolymerization of Carbon Dioxide and Epoxide with Organometallic Compounds; Die Makromolekulare Chemie 130, 210-220, 1969). This reaction is shown in diagram form in equation (I), wherein R represents an organic radical, such as alkyl, alkylaryl or aryl, each of which can also comprise hetero atoms, such as, for example, O, S, Si etc., and wherein e and f represent an integer, and wherein the product shown for the polyether carbonate polyol in equation (I) is merely to be understood as meaning that blocks with the structure shown can in principle be found in the polyether carbonate polyol obtained, but the sequence, number and length of the blocks and the OH functionality of the starter can vary and is not limited to the polyether carbonate polyol shown in equation (I). This reaction (see equation (I)) is ecologically very advantageous, since this reaction represents the conversion of a greenhouse gas, such as $CO_2$, into a polymer. The cyclic carbonate (for example for $R=CH_3$ propylene carbonate) shown in formula (I) is formed as a further product.

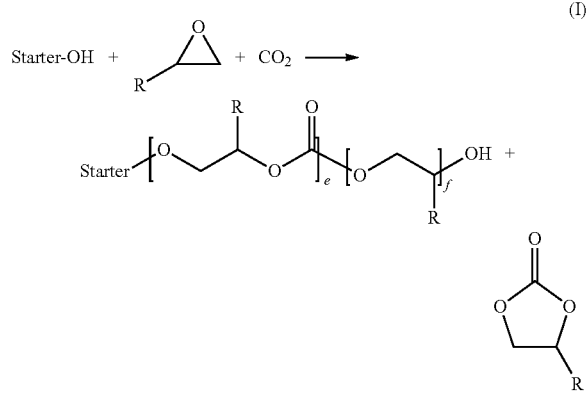

In this preparation of polyether carbonate polyols, the formation of undesirable cyclic carbonates, such as e.g. propylene carbonate, thus occurs (WO 2004/087788 A1, WO 2006/103212 A1). These cyclic carbonates are conventionally removed by distillation, because they have an adverse effect in the secondary reactions of the resulting polyether carbonate polyols with e.g. polyisocyanates, for example because they contain no groups which are reactive towards isocyanates. The removal of the cyclic carbonates by distillation has the disadvantage that this means a considerable outlay on the process (energy, time etc.). The removal of the cyclic carbonates moreover is accompanied by the fact that a part of the raw materials employed are lost to the further reaction with isocyanates.

It was therefore an object of the present invention to provide a process which does not have these disadvantages. In particular, the loss of these cyclic carbonates as raw materials for the further reaction with isocyanates and the distillation step should be avoided.

The invention thus provides a process for the preparation of polyol mixtures comprising polyether carbonate polyol and polyol containing urethane groups, characterized in that
  (i) in a first step one or more alkylene oxides and carbon dioxide are added on to one or more H-functional starter substances in the presence of at least one DMC catalyst ("copolymerization"), and
  (ii) in a second step at least one amino-functional substance is added to the crude mixture formed in step (i).

In step (ii) of the process according to the invention, the cyclic carbonate formed as a by-product in the copolymerization of alkylene oxide and $CO_2$ is reacted with the amino-functional substance, this reaction resulting in a polyol B) containing urethane groups, which is thus present in a mixture with the polyether carbonate polyol A). A polyol mixture comprising polyether carbonate polyol A) and polyol B) containing urethane groups is thus obtained by the process according to the invention without working up steps (such as, for example, distillation).

Industrially available crude mixtures of amines, diamines and/or amino compounds, which additionally can also comprise hydroxyl groups, are employed, for example, as the amino-functional substance.

The process according to the invention has the advantage that from the mixture which comprises undesirable cyclic carbonate and results from the copolymerization, valuable polyol raw materials are obtained in the second step (ii), so that the resulting product can be used in the further reaction to give refined products, such as e.g. with isocyanates to give polyurethanes, without further separation steps (such as, for example, by distillation). The products (polyol mixtures) obtained by the process according to the invention are therefore valuable raw materials for the preparation of polyurethanes (such as, for example, polyurethane foams, polyurethane plastics, thermoplastic polyurethanes, polyurethane dispersions, polyurethane lacquers, polyurethane adhesives and polyurethane sealants).

A preferred embodiment of the invention is a process for the preparation of polyurethanes, characterized in that
  (i) in a first step one or more alkylene oxides and carbon dioxide are added on to one or more H-functional starter substances in the presence of at least one DMC catalyst ("copolymerization"),
  (ii) in a second step at least one amino-functional substance is added to the crude mixture formed in step (i), and
  (iii) the polyol mixture resulting from step (ii) is reacted with di- and/or polyisocyanate.

The process according to the invention is a simple and elegant method for removing cyclic carbonate from copolymerization products of alkylene oxides and carbon dioxide without distillation or other working up steps, this cyclic carbonate being converted into a secondary product which is suitable for processing with isocyanate to give polyurethane. This is effected by reaction of the cyclic carbonate present in the mixture alongside polycarbonate polyols with one or more amino-functional substances (such as, for example, primary and/or secondary amines).

Amino-functional substances in the context of the invention are, for example, aliphatic, cycloaliphatic and/or heterocyclic primary amines, such as, for example, those according to the formulae (II), (III), (IV) and (V)

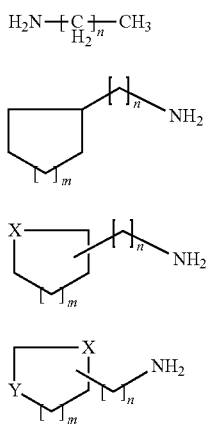

wherein
n denotes an integer from 0 to 17,
m denotes an integer from 0 to 8, preferably 1 or 2, and
X and Y independently of each other represent NH, O or S.

Amino-functional substances which are employed are, preferably, primary monoamines (such as, for example, methylamine, ethylamine, 1-propylamine, 1-ethylpropylamine, 1-butylamine, 1-hexylamine, 2-ethylhexylamine, cyclopentylamine, cyclohexylamine, 2-methylcyclohexylamine, 4-methylcyclohexylamine, cyclooctylamine, 1-octylamine, 1-decylamine, 1-dodecylamine, 1-octadecylamine; N-(3-aminopropyl)-2-pyrrolidinone, 1-aminopyrrolidine, 1-aminopiperidine, 1-amino-4-methylpiperazine, 4-(2-aminoethyl)-morpholine, 1-(2-aminoethyl)-piperidine, 1-(2-aminoethyl)-pyrrolidine, 2-(2-aminoethyl)-thiophene, 4-(2-aminoethyl)-pyridine and polyether-amines (such as e.g. the Jeffamine® M series, for example Jeffamine® M-600 or Jeffamine® M-1000 from Huntsman) and/or secondary monoamines (such as e.g. N-ethylmethylamine, N-cyclohexylmethylamine; ethyleneimine, pyrrolidine, 4,5-dihydropyrazole, oxazolane, piperidine) and/or diamines with primary and/or secondary amino groups (such as e.g. 1,2-diaminoethane, 1,3-diaminopropane, 1,4-diaminobutane, 1,2-bis-(methylamino)-ethane, 1,3-diaminopentane, 1,6-diaminohexane, 1,8-diaminooctane, 1,9-diaminononane, 1,10-diaminodecane, 1,12-diaminododecane, 1,2-diaminocyclohexane, 4,4'-diaminodicyclohexylmethane, isophoronediamine, piperazine, 3-aminopyrrolidine, 2-(aminomethyl)-piperidine, 4-(aminomethyl)-piperidine, 3-aminopiperidine, 4-aminopiperidine, 2-aminomethylpiperidine, 4-aminomethylpiperidine, 2-aminomethylpyrrolidine, piperazine; polyether-diamines, such as e.g. the Jeffamine® D series, for example Jeffamine® D-230, Jeffamine® D-400, Jeffamine® D-2000, Jeffamine® D-4000; aliphatic and cycloaliphatic triamines with primary and/or secondary amino groups, such as e.g. triaminononane (4-aminomethyl-1,8-octanediamine); polyether-amines, such as e.g. Jeffamine® T series, for example Jeffamine® T-403, Jeffamine® T-3000, Jeffamine® T-5000) and/or hydroxy-functional amines with primary or secondary amino groups (such as e.g. 2-aminoethanol, 2-amino-1-propanol, 1-amino-2-propanol, 2-amino-1-butanol, 4-amino-1-butanol, 4-(2-hydroxyethyl)-piperidine, 4-(2-hydroxyethyl)-piperazine, 2-aminocyclohexanol, 4-aminocyclohexanol, 2-aminocyclopentanol, diethanolamine, bis-(2-hydroxypropyl)-amine).

Amino-functional substances which are particularly preferably employed are hydroxy-functional monoamines with a primary or secondary amino group (such as, for example, 2-aminoethanol, 2-amino-1-propanol, 1-amino-2-propanol, 2-amino-1-butanol, 4-amino-1-butanol, 4-(2-hydroxyethyl)-piperidine, 4-(2-hydroxyethyl)-piperazine, 2-aminocyclohexanol, 4-aminocyclohexanol, 2-aminocyclopentanol, diethanolamine, bis-(2-hydroxypropyl)-amine) and/or diamines with primary and/or secondary amino groups (such as, for example, 1,2-diaminoethane, 1,3-diaminopropane, 1,4-diaminobutane, 1,2-bis-(methylamino)-ethane, 1,3-diaminopentane, 1,6-diaminohexane, 1,8-diaminooctane, 1,9-diaminononane, 1,10-diaminodecane, 1,12-diaminododecane, 1,2-diaminocyclohexane, 4,4'-diaminodicyclohexylmethane, isophoronediamine, piperazine, 3-aminopyrrolidine, 2-(aminomethyl)-piperidine, 4-(aminomethyl)-piperidine, 3-aminopiperidine, 4-aminopiperidine, 2-aminomethylpiperidine, 4-aminomethylpiperidine, 2-aminomethylpyrrolidine, piperazine; polyether-diamines). These can be both substances with primary amino groups and those with secondary amino groups. If substances with secondary amino groups are employed, hydroxy-functional polyols B) containing urethane groups with substituted urethane groups result, which has a surprisingly advantageous effect on a low viscosity of the resulting polyol mixtures. Very particularly preferred amino-functional compounds are thus hydroxy-functional monoamines with a secondary amino group (such as, for example, diethanolamine).

In a preferred embodiment of the process of the present invention, step (ii) is carried out in less than 12 h, preferably in less than 1 h after step (i).

The process according to step (i) for the preparation of polyether carbonate polyols by addition of one or more alkylene oxides and carbon dioxide on to one or more H-functional starter substances in the presence of at least one DMC catalyst ("copolymerization") is known from the prior art (e.g. WO-A 2004/087788, WO-A 2006/103212, WO-A 2008/013731, U.S. Pat. No. 4,826,953, WO-A 2008/092767). In this copolymerization, in general up to 30 wt. % of cyclic carbonate can be formed (for example depending on the particular catalyst chosen).

The preparation of polyether carbonate polyol according to step (i) is carried out, for example, by a process for the preparation of polyether carbonate polyols from one or more H-functional starter substances, one or more alkylene oxides and carbon dioxide in the presence of a DMC catalyst, characterized in that (α) the H-functional starter substance or a mixture of at least two H-functional starter substances is initially introduced into the reaction vessel and, where appropriate, water and/or other readily volatile compounds are removed by elevated temperature and/or reduced pressure ("drying"), the DMC catalyst being added to the H-functional starter substance or the mixture of at least two H-functional starter substances before or after the drying, (β) for the activation, a part amount (based on the total amount of the amount of alkylene oxides employed in the activation and copolymerization) of one or more alkylene oxides is added to the mixture resulting from step (α), it being possible for this addition of a part amount of alkylene oxide optionally to be carried out in the presence of $CO_2$, and the temperature peak ("hot spot") which occurs due to the subsequent exothermic chemical reaction and/or a drop in pressure in the reactor then in each case being awaited, and it also being possible for step (β) to be carried out several times for the activation, (γ) one or more alkylene oxides and carbon dioxide are added to the mixture resulting from step (β), it being possible for the alkylene oxides employed in step (γ) to be identical to or different from the alkylene oxides employed in step (β).

A step in which a part amount of alkylene oxide compound, optionally in the presence of $CO_2$, is added to the DMC catalyst and the addition of the alkylene oxide compound is then interrupted, a temperature peak ("hot spot") and/or a drop in pressure in the reactor being observed due to a subsequent exothermic chemical reaction, is called activation in the context of the invention. The process step of activation is the time span from the addition of the part amount of alkylene oxide compound, optionally in the presence of $CO_2$, to the DMC catalyst up to the hot spot. In general, a step for drying the DMC catalyst and, if appropriate, the starter by elevated temperature and/or reduced pressure can precede the activation step, this step of drying not being part of the activation step in the context of the present invention.

Generally, alkylene oxides having 2-24 carbon atoms can be employed for the process according to the invention. The alkylene oxides having 2-24 carbon atoms are, for example, one or more compounds chosen from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, $C_1$-$C_{24}$ esters of epoxidized fatty acids, epichlorohydrin, glycidol, and derivatives of glycidol, such as, for example, methyl glycidyl ether, ethyl glycidyl ether, 2-ethylhexyl glycidyl ether, allyl glycidyl ether, glycidyl methacrylate and epoxide-functional alkyloxysilanes, such as, for example, 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, 3-glycidyloxypropyltriisopropoxysilane. Preferably, ethylene oxide and/or propylene oxide, in particular propylene oxide, are employed as alkylene oxides.

Compounds with H atoms which are active for the alkoxylation can be employed as a suitable H-functional starter substance. Groups which have active H atoms and are active for the alkoxylation are, for example, —OH, —$NH_2$ (primary amines), —NH— (secondary amines), —SH, and —$CO_2H$, and —OH and —$NH_2$ are preferred and —OH is particularly preferred. The H-functional starter substance employed is, for example, one or more compounds chosen from the group consisting of water, mono- or polyfunctional alcohols, mono- or polyfunctional amines, polyfunctional thiols, carboxylic acids, amino alcohols, aminocarboxylic acids, thioalcohols, hydroxy esters, polyether polyols, polyester polyols, polyester ether polyols, polyether carbonate polyols, polycarbonate polyols, polyethyleneimines, polyether-amines (e.g. so-called Jeffamines® from Huntsman, such as e.g. D-230, D-400, D-2000, T-403, T-3000, T-5000 or corresponding products of BASF, such as e.g. Polyetheramine D230, D400, D200, T403, T5000), polytetrahydrofurans (e.g. PolyTHF® of BASF, such as e.g. PolyTHF® 250, 650S, 1000, 1000S, 1400, 1800, 2000), polytetrahydrofuranamines (BASF product Polytetrahydrofuranamine 1700), polyether thiols, polyacrylate polyols, castor oil, the mono- or diglyceride of ricinoleic acid, monoglycerides of fatty acids, chemically modified mono-, di- and/or triglycerides of fatty acids, and $C_1$-$C_{24}$-alkyl fatty acid esters which comprise on average at least 2 OH groups per molecule. By way of example, the $C_1$-$C_{24}$-alkyl fatty acid esters which comprise on average at least 2 OH groups per molecule are commercial products such as Lupranol Balance® (BASF SE), Merginol® types (Hobum Oleochemicals GmbH), Sovermol® types (Cognis Deutschland GmbH & Co. KG) and Soyol®TM types (USSC Co.).

Monofunctional starter compounds which can be employed are alcohols, amines, thiols and carboxylic acids. Monofunctional alcohols which can be used are: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Possible monofunctional amines are: butylamine, tert-butylamine, pentylamine, hexylamine, aniline, aziridine, pyrrolidine, piperidine, morpholine. Monofunctional thiols which can be used are: ethanethiol, 1-propanethiol, 2-propanethiol, 1-butanethiol, 3-methyl-1-butanethiol, 2-butene-1-thiol, thiophenol. Monofunctional carboxylic acids which may be mentioned are: formic acid, acetic acid, propionic acid, butyric acid, fatty acids, such as stearic acid, palmitic acid, oleic acid, linoleic acid, linolenic acid, benzoic acid, acrylic acid.

Polyfunctional alcohols which are suitable as H-functional starter substances are, for example, difunctional alcohols (such as, for example, ethylene glycol, diethylene glycol, propylene glycol, dipropylene glycol, 1,3-propanediol, 1,4-butanediol, 1,4-butenediol, 1,4-butynediol, neopentyl glycol, 1,5-pentanediol, methylpentanediols (such as, for example, 3-methyl-1,5-pentanediol), 1,6-hexanediol, 1,8-octanediol, 1,10-decanediol, 1,12-dodecanediol, bis-(hydroxymethyl)-cyclohexanes (such as, for example, 1,4-bis-(hydroxymethyl) cyclohexane), triethylene glycol, tetraethylene glycol, polyethylene glycols, dipropylene glycol, tripropylene glycol, polypropylene glycols, dibutylene glycol and polybutylene glycols); trifunctional alcohols (such as, for example, trimethylolpropane, glycerol, trishydroxyethyl isocyanurate, castor oil); tetrafunctional alcohols (such as, for example, pentaerythritol); polyalcohols (such as, for example, sorbitol, hexitol, sucrose, starch, starch hydrolysates, cellulose, cellulose hydrolysates, hydroxy-functionalized fats and oils, in particular castor oil), and all modification products of these abovementioned alcohols with various amounts of ε-caprolactone.

The H-functional starter substances can also be chosen from the substance class of polyether polyols, in particular those with a molecular weight Mn in the range of from 100 to 4,000 g/mol. Polyether polyols which are built up from recurring ethylene oxide and propylene oxide units are preferred, preferably with a content of from 35 to 100% of propylene oxide units, particularly preferably with a content of from 50 to 100% of propylene oxide units. These can be random copolymers, gradient copolymers or alternating or block copolymers of ethylene oxide and propylene oxide. Suitable polyether polyols built up from recurring propylene oxide and/or ethylene oxide units are, for example, the Desmophen®, Acclaim®, Arcol®, Baycoll®, Bayfill®, Bayflex®, Baygal®, PET® and polyether polyols of Bayer MaterialScience AG (such as e.g. Desmophen® 3600Z, Desmophen® 1900U, Acclaim® Polyol 2200, Acclaim® Polyol 4000I, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S180). Further suitable homo-polyethylene oxides are, for example, the Pluriol® E brands of BASF SE, suitable homo-polypropylene oxides are, for example, the Pluriol® P brands of BASF SE, and suitable mixed copolymers of ethylene oxide and propylene oxide are, for example, the Pluronic® PE or Pluriol® RPE brands of BASF SE.

The H-functional starter substances can also be chosen from the substance class of polyester polyols, in particular those with a molecular weight Mn in the range of from 200 to 4,500 g/mol. At least difunctional polyesters are employed as polyester polyols. Polyester polyols preferably consist of alternating acid and alcohol units. Acid components which are employed are e.g. succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixture of the acids and/or anhydrides mentioned. Alcohol components which are used are e.g. ethanediol, 1,2-propanediol, 1,3-propanediol, 1,4-butanediol, 1,5-pentanediol, neopentyl glycol, 1,6-hexanediol, 1,4-bis-(hydroxymethyl)-cyclohexane, diethylene glycol, dipropylene glycol trimethylolpropane, glycerol, pentaerythritol or mixtures of the alcohols mentioned. If difunctional or polyfunctional polyether polyols are employed as the alcohol component, polyester ether polyols, which can likewise serve as starter substances for the preparation of the polyether carbonate polyols, are obtained. Preferably, polyether polyols with Mn=150 to 2,000 g/mol are employed for the preparation of the polyester-ether polyols.

Polycarbonate diols can furthermore be employed as H-functional starter substances, in particular those with a molecular weight Mn in the range of from 150 to 4,500 g/mol, preferably 500 to 2,500, which are prepared, for example, by reaction of phosgene, dimethyl carbonate, diethyl carbonate or diphenyl carbonate and difunctional alcohols or polyester polyols or polyether polyols. Examples of polycarbonates are to be found e.g. in EP-A 1359177. For example, the Desmophen® C types of Bayer MaterialScience AG, such as e.g. Desmophen® C 1100 or Desmophen® C 2200, can be used as polycarbonate diols.

In a further embodiment of the invention, polyether carbonate polyols can be employed as H-functional starter substances. In particular, polyether carbonate polyols which are obtainable by the process according to the invention described here are employed. These polyether carbonate polyols employed as H-functional starter substances are prepared beforehand for this in a separate reaction step.

The H-functional starter substances in general have a functionality (i.e. number of H atoms per molecule which are active for the polymerization) of from 1 to 8, preferably of 2 or 3. The H-functional starter substances are employed either individually or as a mixture of at least two H-functional starter substances.

Preferred H-functional starter substances are alcohols of the general formula (VI)

HO—(CH$_2$)$_x$—OH (VI)

wherein x is a number from 1 to 20, preferably an even number from 2 to 20. Examples of alcohols according to formula (VI) are ethylene glycol, 1,4-butanediol, 1,6-hexanediol, 1,8-octanediol, 1,10-decanediol and 1,12-dodecanediol. Further preferred H-functional starter substances are neopentyl glycol, trimethylolpropane, glycerol, pentaerythritol, reaction products of the alcohols according to formula (VI) with ε-caprolactone, e.g. reaction products of trimethylolpropane with ε-caprolactone, reaction products of glycerol with ε-caprolactone and reaction products of pentaerythritol with ε-caprolactone. H-functional starter substances which are furthermore preferably employed are water, diethylene glycol, dipropylene glycol, castor oil, sorbitol and polyether polyols built up from recurring polyalkylene oxide units.

The H-functional starter substances are particularly preferably one or more compounds chosen from the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, 1,8-octanediol, diethylene glycol, dipropylene glycol, glycerol, trimethylolpropane, di- and trifunctional polyether polyols, wherein the polyether polyol is built up from a di- or tri-H-functional starter substance and propylene oxide or a di- or tri-H-functional starter substance, propylene oxide and ethylene oxide. The polyether polyols preferably have a molecular weight Mn in the range of from 62 to 4,500 g/mol and a functionality of from 2 to 3, and in particular a molecular weight Mn in the range of from 62 to 3,000 g/mol and a functionality of from 2 to 3.

The preparation of the polyether carbonate polyols is carried out by catalytic addition of carbon dioxide and alkylene oxides on to H-functional starter substances. In the context of the invention, "H-functional" is understood as meaning the number of H atoms per molecule of the starter compound which are active for the alkoxylation.

DMC catalysts are known in principle from the prior art (see e.g. U.S. Pat. No. 3,404,109, U.S. Pat. No. 3,829,505, U.S. Pat. No. 3,941,849 and U.S. Pat. No. 5,158,922). DMC catalysts, which are described e.g. in U.S. Pat. No. 5,470,813, EP-A 700 949, EP-A 743 093, EP-A 761 708, WO 97/40086, WO 98/16310 and WO 00/47649, have a very high activity in the homopolymerization of epoxides and render possible the preparation of polyether polyols at very low catalyst concentrations (25 ppm or less), so that in general it is no longer necessary to separate off the catalyst from the finished product. The highly active DMC catalysts described in EP-A 700 949, which, in addition to a double metal cyanide compound (e.g. zinc hexacyanocobaltate(III)) and an organic complexing ligand (e.g. tert-butanol), also contain a polyether with a number-average molecular weight of greater than 500 g/mol, are a typical example.

The DMC catalysts according to the invention are obtained, for example, by a procedure in which
(i) in the first step an aqueous solution of a metal salt is reacted with the aqueous solution of a metal cyanide salt in the presence of one or more organic complexing ligands, e.g. of an ether or alcohol,
(ii) wherein in the second step the solid is separated off by known techniques (such as centrifugation or filtration) from the suspension obtained from (i),
(iii) wherein, if appropriate, in a third step the solid which has been isolated is washed with an aqueous solution of an organic complexing ligand (e.g. by resuspending and subsequent renewed isolation by filtration or centrifugation),
(iv) wherein the solid obtained, if appropriate after pulverization, is subsequently dried at temperatures of in general 20-120° C. and under pressures of from in general 0.1 mbar to normal pressure (1013 mbar), and wherein in the first step or immediately after the precipitation of the double metal cyanide compound (second step), one or more organic complexing ligands, preferably in excess (based on the double metal cyanide compound) and optionally further complexing components are added.

The double metal cyanide compounds contained in the DMC catalysts according to the invention are the reaction products of water-soluble metal salts and water-soluble metal cyanide salts. For example, an aqueous solution of zinc chloride (preferably in excess, based on the metal cyanide salt, such as, for example, potassium hexacyanocobaltate) and potassium hexacyanocobaltate is mixed and dimethoxyethane (glyme) or tert-butanol (preferably in excess, based on zinc hexacyanocobaltate) is then added to the suspension formed.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron (II) chloride, iron(III) chloride, cobalt(II) chloride, cobalt(II) thiocyanate, nickel(II) chloride and nickel(II) nitrate. Mixtures of various metal salts can also be employed.

Examples of suitable metal cyanide salts are sodium hexacyanocobaltate(III), potassium hexacyanocobaltate(III), potassium hexacyanoferrate(II), potassium hexacyanoferrate (III), calcium hexacyanocobaltate(III) and lithium hexacyanocobaltate(III).

Examples of suitable double metal cyanide compounds a) are zinc hexacyanocobaltate(III), zinc hexacyanoiridate(III), zinc hexacyanoferrate(III) and cobalt(II) hexacyanocobaltate (III). Further examples of suitable double metal cyanide compounds are to be found e.g. in U.S. Pat. No. 5,158,922 (column 8, lines 29-66). Zinc hexacyanocobaltate(III) is particularly preferably used.

The reaction of the crude mixture resulting form step (i) with at least one amino-functional substance is carried out, for example, after determination of the content of cyclic carbonate in the crude mixture. Preferably, the content of cyclic carbonate in the mixture obtained from step (i) is determined, and in step (ii) the amino-functional substance is employed in a molar ratio of amino-functional substance to cyclic carbonate of from 1.5:1.0 to 0.5:1.0, particularly preferably 1.1:1.0 to 0.9:1.0.

In the reaction according to step (ii), a reaction of the cyclic carbonate with the amino-functional substance is carried out. The reaction according to step (ii) is carried out, for example, at temperatures of between 0 and 150° C., preferably 10 to 140° C., particularly preferably 20 to 130° C. and very particularly preferably 30 to 120° C. The course of the reaction can be easily monitored by means of IR spectroscopy and titration of the amine number. In this context, the intensity of the carbonyl band of the cyclic carbonate at about 1800 cm$^{-1}$ disappears in the course of the reaction, and the amine number of the reaction mixture drops as the reaction of the amino-functional substance employed with the cyclic carbonate progresses. The carbonyl band of the polyether carbonate polyol (1740-1750 cm$^{-1}$) remains virtually unchanged in the course of the reaction.

By the choice of the amino-functional substance employed or the use of mixtures of two or more amino-functional substances, in the reaction of the cyclic carbonate with these amino-functional substances the number of groups which are reactive to isocyanate groups per molecule of the polyol B) containing urethane groups formed can be controlled. For example, from the reaction of cyclic carbonate with a) amino-functional substance=primary amine having one hydroxyl group per molecule (such as, for example, 2-aminoethanol): polyols B) containing urethane groups having 2 hydroxyl groups per molecule result, b) amino-functional substance=secondary amine having two hydroxyl groups per molecule (such as, for example, diethanolamine): polyols B) containing urethane groups having 3 hydroxyl groups per molecule result.

Particularly preferably, the polyols B) containing urethane groups of the polyol mixtures according to the invention have 2 to 3 hydroxyl groups per molecule and OH numbers of from 90 to 815 mg of KOH/g. Particularly preferably, the polyols B) containing urethane groups have 2 to 3 hydroxyl groups per molecule and OH numbers of from 340 to 815 mg of KOH/g. Very particularly preferably, the polyols B) containing urethane groups have 2 to 3 hydroxyl groups per molecule and OH numbers of from 680 to 815 mg of KOH/g.

The polyether carbonate polyols A) of the polyol mixtures according to the invention have number-average molecular weights of from 500 to 10,000 Da, preferably 500 to 8,000 Da, particularly preferably 500 to 6,000 Da and very particularly preferably 500 to 4,000 Da. The number of hydroxyl groups per molecule (functionality) of the polyether carbonate polyol A) is in general 1 to 8, preferably 2 to 6, particularly preferably 2 to 4 and very particularly preferably 2 to 3.

The polyol mixtures according to the invention resulting from step (ii) are in general obtained as homogeneous, clear to slightly cloudy mixtures comprising polyether carbonate polyols A) and polyols B) containing urethane groups. These mixtures according to the invention are valuable raw materials for the preparation of polyurethanes (such as, for example, polyurethane foams, polyurethane plastics, thermoplastic polyurethanes, polyurethane dispersions, polyurethane lacquers, polyurethane adhesives and polyurethane sealants).

The reaction according to step (iii) of the polyol mixture resulting from step (ii) with di- and/or polyisocyanate is carried out by processes known per se. In this context, the polyol mixture resulting from step (ii) can be employed both in the presence of organic solvents, as an aqueous formulation or in a solvent-free form.

Organic and/or modified di- and/or polyisocyanates can be employed as the di- and/or polyisocyanate. These are known in principle to the person skilled in the art and are described, for example, in "Kunststoffhandbuch", volume 7 "Polyurethane", chapter 5.1, e.g. aliphatic, cycloaliphatic, araliphatic, aromatic and heterocyclic polyisocyanates of the formula Q(NCO)$_n$, in which n=2-4, preferably 2, and Q denotes an aliphatic hydrocarbon radical having 2-18, preferably 6-10 C atoms, a cycloaliphatic hydrocarbon radical having 4-15, preferably 5-10 C atoms, an aromatic hydrocarbon radical having 6-15, preferably 6-13 C atoms, or an araliphatic hydrocarbon radical having 8-15, preferably 8-13 C atoms, e.g. those isocyanates such as are described in DE-OS 2 832 253, pages 10-11.

The polyol mixtures according to the invention can also be mixed with polyether polyols, polyether ester polyols and/or polyester polyols for reaction with the di- and/or polyisocyanate. Suitable polyether polyols, polyether ester polyols and/or polyester polyols have an OH number range of from conventionally 9 to 200, preferably 14 to 180 and particularly preferably 28 to 150 mg of KOH/g and a functionality of from 1 to 6, preferably 2 to 4 and particularly preferably 2 to 3.

The reaction according to step (iii) of the polyol mixture resulting from step (ii) with di- and/or polyisocyanate can also be carried out in the presence of solvents, blowing agents, flameproofing agents, catalysts, stabilizers and/or other auxiliary substances and additives, such as is known in principle to the person skilled in the art and described, for example, in "Kunststoffhandbuch", volume 7, "Polyurethane", chapter 3.4.

EXAMPLES

The OH number was determined in accordance with DIN 53240-2, pyridine being used as the solvent, however, instead of THF/methylene chloride. Titration was carried out with 0.5 molar ethanolic KOH (end point detection by means of potentiometry). Castor oil with an OH number specified by certificate functioned as the test substance. The unit stated in "mg/g" relates to mg[KOH]/g[polyether carbonate polyol].

The ratio of cyclic carbonate (propylene carbonate) to polyether carbonate polyol was determined by means of $^1$H-NMR (Bruker, DPX 400, 400 MHz; pulse program zg30, waiting time d1: 10 s, 64 scans). The sample was dissolved in deuterated chloroform in each case. The relevant resonances in the $^1$H-NMR (based on TMS=0 ppm) are as follows:

cyclic carbonate (which was formed as a by-product) resonance at 4.5 ppm, carbonate, resulting from carbon dioxide incorporated in the polyether carbonate polyol (resonances at 5.1 to 4.8 ppm), unreacted PO with resonance at 2.4 ppm, polyether polyol (i.e. without incorporated carbon dioxide) with resonances at 1.2 to 1.0 ppm, the 1,8-octanediol, incorporated as the starter molecule, with a resonance at 1.6 to 1.52 ppm.

The molar content of the carbonate incorporated in the polymer in the reaction mixture is calculated according to formula (VII) as follows, the following abbreviations being used:

A(4.5)=area of the resonance at 4.5 ppm for cyclic carbonate (corresponds to an H atom)

A(5.1–4.8)=area of the resonance at 5.1–4.8 ppm for polyether carbonate polyol and an H atom for cyclic carbonate.

A(2.4)=area of the resonance at 2.4 ppm for free, unreacted PO

A(1.2–1.0)=area of the resonance at 1.2–1.0 ppm for polyether polyol

A(1.6–1.52)=area of the resonance at 1.6 to 1.52 ppm for 1,8-octanediol (starter)

Taking into account the relative intensities, the polymer-bonded carbonate ("linear carbonate" LC) in the reaction mixture was converted into mol % according to the following formula (VII)

$$LC = \frac{A(5.1-4.8) - A(4.5)}{A(5.1-4.8) + A(2.4) + 0.33 * A(1.2-1.0) + 0.25 * A(1.6-1.52)} * 100 \quad \text{(VII)}$$

The weight content (in wt. %) of polymer-bonded carbonate (LC') in the reaction mixture was calculated according to formula (VIII)

$$LC' = \frac{[A(5.1-4.8) - A(4.5)] * 102}{N} * 100\% \quad \text{(VIII)}$$

the value for N ("denominator" N) being calculated according to formula (IX):

$$N=[A(5.1-4.8)A(4.5)]*102+A(4.5)*102+A(2.4)*58+ \\ 0.33*A(1.2-1.0)*58+0.25*A(1.6-1.52)*146 \quad \text{(IX)}$$

The factor 102 results from the sum of the molecular weights of $CO_2$ (molecular weight 44 g/mol) and that of propylene oxide (molecular weight 58 g/mol), the factor 58 results from the molecular weight of propylene oxide and the factor 146 results from the molecular weight of the starter employed, 1,8-octanediol.

The weight content (in wt. %) of cyclic carbonate (CC') in the reaction mixture was calculated according to formula (X)

$$CC' = \frac{A(4.5) * 102}{N} * 100\% \quad \text{(X)}$$

the value for N being calculated according to formula (IX).

In order to calculate from the values of the composition of the reaction mixture the composition based on the polymer content (consisting of polyether polyol, which was built up from the starter and propylene oxide during the activation steps which took place under $CO_2$-free conditions, and polyether carbonate polyol, built up from the starter, propylene oxide and carbon dioxide during the activation steps which took place in the presence of $CO_2$ and during the copolymerization), the non-polymer constituents of the reaction mixture (i.e. cyclic propylene carbonate and any unreacted propylene oxide present) were eliminated by calculation. The weight content of the carbonate recurring units in the polyether carbonate polyol was converted into a weight content of carbon dioxide by means of the factor F=44/(44+58). The $CO_2$ content in the polyether carbonate polyol stated ("$CO_2$ incorporated"; see the following examples and Table 1) is standardized to the content of the polyether carbonate polyol molecule which was formed during the copolymerization and, where appropriate, the activation steps in the presence of $CO_2$ (i.e. the content of the polyether carbonate polyol molecule which results from the starter (1,8-octanediol) and from the reaction of the starter with epoxide which was added under $CO_2$-free conditions was not taken into account here).

Step (i), i.e. the preparation of the crude mixture containing polyether carbonate polyol and cyclic carbonate (propylene carbonate) was carried out by the process according to WO-A 2008/013731, 1,8-octanediol being employed as the starter polyol and propylene oxide being employed as the alkylene oxide, and the DMC catalyst employed was prepared in accordance with Example 6 of WO-A 01/80994. Two crude mixtures with the following characteristic data were synthesized in this manner:

Crude Mixture 1:
  OH number: 59.3 mg of KOH/g
  $CO_2$ incorporated: 18.4 wt. %
  Polyether carbonate polyol content: 93.7 wt. %
  Propylene carbonate content: 6.3 wt. %
  Viscosity: 3,000 mPas (23° C.)

Crude Mixture 2:
  OH number: 65.2 mg of KOH/g
  $CO_2$ incorporated: 19.9 wt. %
  Polyether carbonate polyol content: 89.2 wt. %
  Propylene carbonate carbonate: 10.8 wt. %
  Viscosity: 1,250 mPas (23° C.)

Example 1 (According to the Invention)

100 g of crude mixture 1 were initially introduced into a 250 ml four-necked flask with a stirrer, dropping funnel, reflux condenser and nitrogen inlet and were heated up to 50° C. 3.75 g of 2-aminoethanol were then added dropwise at 50° C. in the course of 10 minutes. The mixture was stirred at 50°

C. until no further amine number was titratable or until the amine number was constant. The course of the reaction was moreover monitored by means of the IR spectrum. It was to be found that the band of the cyclic carbonate at 1806 cm$^{-1}$ disappeared in the course of the reaction. The band of the linear carbonate groups at 1745 cm$^{-1}$ remained. The two new bands of the urethane group formed were to be seen at 1690 cm$^{-1}$ (shoulder) and 1538 cm$^{-1}$. A polyol mixture with a viscosity of 6,340 mPa·s (23° C.) and an OH number of 130 mg of KOH/g was formed.

Example 2 (According to the Invention)

100 g of crude mixture 2 were initially introduced into a 250 ml four-necked flask with a stirrer, dropping funnel, reflux condenser and nitrogen inlet and were heated up to 50° C. 6.45 g of 2-aminoethanol were then added dropwise at 50° C. in the course of 10 minutes. The mixture was stirred at 50° C. until no further amine number was titratable or until the amine number was constant. The course of the reaction was moreover monitored by means of the IR spectrum. It was to be found that the band of the cyclic carbonate at 1799 cm$^{-1}$ disappeared in the course of the reaction. The band of the linear carbonate groups at 1747 cm$^{-1}$ remained. The two new bands of the urethane group formed were to be seen at 1691 cm$^{-1}$ (shoulder) and 1538 cm$^{-1}$. A polyol mixture with a viscosity of 3330 mPa·s (23° C.) and an OH number of 156 mg of KOH/g was formed.

Example 3 (According to the Invention)

100 g of crude mixture 1 were initially introduced into a 250 ml four-necked flask with a stirrer, dropping funnel, reflux condenser and nitrogen inlet and were heated up to 80° C. 6.45 g of diethanolamine were then added dropwise at 80° C. in the course of 10 minutes. The mixture was stirred at 80° C. until no further amine number was titratable or until the amine number was constant. The course of the reaction was moreover monitored by means of the IR spectrum. It was to be found that the band of the cyclic carbonate at 1799 cm$^{-1}$ disappeared in the course of the reaction. The band of the linear carbonate groups at 1745 cm$^{-1}$ remained. The two new bands of the urethane group formed were to be seen at 1695 cm$^{-1}$ (shoulder) and 1541 cm$^{-1}$. A polyol mixture with a viscosity of 5180 mPa·s (23° C.) and an OH number of 154 mg of KOH/g was formed.

Examples 1 to 3 demonstrate with the aid of the analytical data that the cyclic carbonate is reacted with the aid of amino-functional substances to give polyol containing urethane groups, while the carbonate group of the polyether carbonate polyol does not react with the amino-functional substance.

Example 4 (According to the Invention)

50.0 g of polyol mixture from Example 2 were mixed with 29.8 g of Desmodur® N 3390 BA (aliphatic polyisocyanate of Bayer MaterialScience AG, 90% strength in butyl acetate with an NCO content of 19.6 wt. %) by stirring. This mixture was drawn on to a glass plate as a wet film with a film thickness of 50 μm with the aid of a commercially available film-drawing unit. After evaporation of the solvent (butyl acetate) in air at room temperature, the glass plate was kept at 80° C. for 30 min and then at room temperature for 24 h. A clear lacquer film which had a good resistance to xylene (92 double strokes with an impregnated cotton pad before damage became visible) and high-octane petrol (97 double strokes with an impregnated cotton pad before damage became visible) was obtained.

Example 4 demonstrates that the polyol mixtures obtainable by the process according to the invention can be processed with isocyanate to give polyurethanes, in this case to give a polyurethane lacquer film, without further working up.

The invention claimed is:

1. A process for the preparation of a polyol mixture comprising polyether carbonate polyol A) and polyol containing urethane groups B), wherein
   (i) in a first step a crude mixture containing the polyether carbonate polyol A) and a cyclic carbonate is formed by copolymerization, wherein one or more alkylene oxides and carbon dioxide are added on to one or more H-functional starter substances in the presence of at least one double metal cyanide (DMC) catalyst,
   wherein
   (α) the H-functional starter substance or a mixture of at least two H-functional starter substances is initially introduced into the reaction vessel and the DMC catalyst being added to the H-functional starter substance or the mixture of at least two H-functional starter substances,
   (β) for the activation, a part amount, based on the total amount of the amount of alkylene oxides employed in the activation and copolymerization, of one or more alkylene oxides is added to the mixture resulting from step (α), wherein optionally, this addition of a part amount of alkylene oxide is carried out in the presence of CO2, and the temperature peak which occurs due to the subsequent exothermic chemical reaction and/or a drop in pressure in the reactor then in each case is being awaited, and whereby step (β) can optionally be carried out several times for the activation,
   (γ) one or more alkylene oxides and carbon dioxide are added to the mixture resulting from step (β), it being possible for the alkylene oxides employed in step (γ) to be identical to or different from the alkylene oxides employed in step (β);
   and
   (ii) in a second step at least one amino-functional substance is added to the crude mixture formed in step (i) and is reacted with the cyclic carbonate formed in step (i) to form the polyol containing urethane groups B), wherein the reaction according to step (ii) is carried out at temperatures of between 0 and 150° C.

2. The process according to claim 1, wherein the amino-functional substance is an aliphatic, a cycloaliphatic and/or a heterocyclic primary amine.

3. The process according to claim 1, wherein the amino-functional substance is a primary monoamine, a secondary monoamine, a diamine with primary and/or secondary amino groups and/or a hydroxy-functional amine with primary or secondary amino groups.

4. The process according to claim 1, wherein step (ii) is carried out in less than 12 h after step (i).

5. The process according to claim 1, wherein a content of cyclic carbonate in the mixture obtained from step (i) is determined, and in step (ii) the amino-functional substance is employed in a molar ratio of amino-functional substance to cyclic carbonate of from 1.5:1.0 to 0.5:1.0.

6. The process according to claim 1, wherein the amino-functional substance is selected from the group consisting of 2-aminoethanol, 2-amino-1-propanol, 1-amino-2-propanol, 2-amino-1-butanol, 4-amino-1-butanol, 4-(2-hydroxyethyl)-piperidine, 4-(2-hydroxyethyl)-piperazine, 2-aminocyclohexanol, 4-aminocyclohexanol, 2-aminocyclopentanol, diethanolamine, bis-(2-hydroxypropyl)-amine and diamine with primary and/or secondary amino groups.

7. The process according to claim 6, wherein the diamine with primary and/or secondary amino groups is selected from the group consisting of 1,2-diaminoethane, 1,3-diaminopropane, 1,4-diaminobutane, 1,2-bis-(methylamino)-ethane, 1,3-diaminopentane, 1,6-diaminohexane, 1,8-diaminooctane, 1,9-diaminononane, 1,10-diaminodecane, 1,12-diaminododecane, 1,2-diaminocyclohexane, 4,4'-diaminodicyclohexylmethane, isophoronediamine, piperazine, 3-aminopyrrolidine, 2-(aminomethyl)-piperidine, 4-(aminomethyl)-piperidine, 3-aminopiperidine, 4-aminopiperidine, 2-aminomethylpiperidine, 4-aminomethylpiperidine, 2-aminomethylpyrrolidine, piperazine, and polyether-diamine.

8. A process for the preparation of a polyurethane which comprises the process according to claim 1 and a subsequent third step, wherein (iii) the polyol mixture resulting from step (ii) is reacted with di- and/or polyisocyanate.

9. The process according to claim 8, wherein the polyurethane is an isocyanate-functional prepolymer, an aqueous polyurethane dispersion, a lacquer, an adhesive, a sealant or a plastic.

\* \* \* \* \*